(12) United States Patent
Shinde et al.

(10) Patent No.: US 8,668,037 B2
(45) Date of Patent: Mar. 11, 2014

(54) SADDLE-RIDE-TYPE ELECTRICALLY OPERATED VEHICLE

(75) Inventors: Yasuo Shinde, Wako (JP); Nobuo Nakai, Wako (JP); Masahiko Takenaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/289,394

(22) Filed: Nov. 4, 2011

(65) Prior Publication Data

US 2012/0118659 A1 May 17, 2012

(30) Foreign Application Priority Data

Nov. 11, 2010 (JP) ................................ 2010-252860

(51) Int. Cl.
  *B60R 16/04* (2006.01)
(52) U.S. Cl.
  USPC .............. 180/68.5; 180/60; 180/61; 180/62
(58) Field of Classification Search
  USPC ............ 180/68.5, 65.1, 216, 65.51, 89.17, 55, 180/56, 60–63
  See application file for complete search history.

(56) References Cited

U.S. PATENT DOCUMENTS

| | | | | |
|---|---|---|---|---|
| 848,267 | A * | 3/1907 | Schmidt et al. | 180/60 |
| 3,179,199 | A * | 4/1965 | Moran | 180/65.6 |
| 3,294,190 | A * | 12/1966 | Suvor et al. | 180/216 |
| 3,504,934 | A * | 4/1970 | Wallis | 280/282 |
| 3,713,502 | A * | 1/1973 | Delaney et al. | 180/206.5 |
| 4,111,274 | A * | 9/1978 | King et al. | 180/206.2 |
| 4,183,418 | A * | 1/1980 | Dudas | 180/216 |
| 4,325,448 | A * | 4/1982 | Pivar | 180/215 |
| 4,541,501 | A * | 9/1985 | Kawasaki | 180/215 |
| 4,826,057 | A * | 5/1989 | Yamada | 224/412 |
| 5,207,288 | A * | 5/1993 | Ono | 180/220 |
| 5,460,234 | A * | 10/1995 | Matsuura et al. | 180/65.1 |
| 5,561,359 | A * | 10/1996 | Matsuura et al. | 180/68.2 |
| 5,657,830 | A * | 8/1997 | Kawashima et al. | 180/220 |
| 5,965,996 | A * | 10/1999 | Arledge et al. | 320/116 |
| 6,047,786 | A * | 4/2000 | Stevenson et al. | 180/65.1 |
| 6,691,813 | B2 * | 2/2004 | Schless | 180/220 |
| 2001/0000394 | A1 * | 4/2001 | Whittaker | 180/220 |
| 2005/0039964 | A1 * | 2/2005 | Goyry | 180/243 |
| 2009/0020348 | A1 * | 1/2009 | Horii et al. | 180/65.3 |
| 2009/0020352 | A1 * | 1/2009 | Horii et al. | 180/212 |
| 2009/0075152 | A1 * | 3/2009 | Horji et al. | 429/34 |
| 2009/0167011 | A1 * | 7/2009 | Braga | 280/848 |
| 2010/0133030 | A1 * | 6/2010 | Johnson et al. | 180/68.5 |

FOREIGN PATENT DOCUMENTS

| | | | | | |
|---|---|---|---|---|---|
| JP | 59186737 | A | * | 10/1984 | ............ B60K 5/12 |
| JP | 05039073 | A | * | 2/1993 | ............ B62K 5/04 |
| JP | 06-255557 | | | 9/1994 | |
| JP | 11278343 | A | * | 10/1999 | ............ B62J 39/00 |

* cited by examiner

*Primary Examiner* — J. Allen Shriver, III
*Assistant Examiner* — Steve Clemmons
(74) *Attorney, Agent, or Firm* — Rankin, Hill & Clark LLP

(57) ABSTRACT

In an electrically-operated vehicle including rear wheels on right and left sides of a rear portion of a vehicle body, the electrically-operated vehicle includes a motor that drives the rear wheels, a battery 51 that is arranged above the motor, and a lower battery that is placed between the right and left rear wheels. The lower battery and the motor are arranged in a distributed manner over an axle of the rear wheels between a vehicle front side of the axle of the rear wheels and a vehicle rear side of the axle of the rear wheels. An upper end portion of a rear cushion is supported on a vehicle body frame, and the battery and the motor are supported on a lower end of the rear cushion.

11 Claims, 11 Drawing Sheets

SADDLE-RIDE-TYPE ELECTRICALLY OPERATED VEHICLE

BACKGROUND OF THE INVENTION

1. Field of the Invention

The present invention generally relates to a saddle-ride-type electrically operated vehicle and, more particularly, toward an electrically operated three-wheeled vehicle.

2. Description of Related Art

Electrically operated three-wheeled vehicles that use a motor as a prime mover are known. In such electrically operated three-wheeled vehicles, a battery support frame is laterally swingably supported on a rear portion of a floor of a vehicle body frame via a rolling joint. A front end of a swing arm is vertically swingably supported on the battery support frame, and rear wheels are pivotally supported on a rear end of the swing arm. The swing arm is provided with a motor and a transmission, and these parts constitute a swing unit together with the rear wheels. JP-A-6-255557 teaches such a three-wheeled vehicle.

However, in the above-mentioned conventional electrically-operated three-wheeled vehicles, when a position of a battery is elevated so as to form a gap in consideration of a cushion stroke for a motor or a tire, there arise drawbacks such as large sizing of the swing unit and difficulty in lowering the center of gravity. On the other hand, when the battery is made compact, capacity of the battery is restricted.

SUMMARY OF THE INVENTION

Accordingly, the present invention is directed toward a saddle-ride-type electrically-operated vehicle having a low center of gravity and a large battery capacity.

In accordance with the present invention, an electrically-operated vehicle includes rear wheels on right and left sides of a rear portion of a vehicle body, a motor that drives the rear wheels, and a battery. The battery includes an upper battery that is arranged above the motor and a lower battery that is placed between the right and left rear wheels. The lower battery and the motor are arranged in a distributed manner over an axle of the rear wheels between a vehicle front side of the rear wheel axle and a vehicle rear side of the rear wheel axle. An upper end portion of a rear cushion is supported on a vehicle body frame, and the battery and the motor are supported on a lower end of the rear cushion.

According to this arrangement, the upper and lower batteries and the motor are supported on the lower end of the rear cushion and hence, the lower battery can be arranged at the lower end of the rear cushion thus lowering the center of gravity of the vehicle and, at the same time, allowing battery capacity to be increased. Since the battery capacity can be increased in this manner, a traveling distance of the vehicle can be extended. Further, the lower battery and the motor can be arranged in a distributed manner over the axle of the rear wheels between the vehicle front side of the axle of the rear wheels and the vehicle rear side of the axle of the rear wheels and hence, a large amount of weight can be distributed in a well-balanced manner longitudinally over the axle.

In further accordance with the present invention, the battery is arranged in front of rear ends of the rear wheels. Therefore, a force generated when a rear surface of the vehicle is impacted during collision is received by the rear wheels and hence, the battery can be protected.

In accordance with another aspect of the invention, a carrier is provided above the battery, and the carrier is upwardly rotatably supported by way of a hinge. According to this structure, an area above the battery can be accessed by opening the carrier and hence, maintenance of the battery is facilitated.

In further accordance with the present invention, the battery is housed in a battery case, and right and left side walls of the battery case serve as inner fenders. Therefore, the number of parts can be reduced by effectively making use of the battery case.

In accordance with another aspect of the invention, the battery case includes an openable/closable lid provided with a seal on an upper portion thereof, a flange portion that bulges outward in the lateral direction from the seal portion is formed on the side walls of the battery case, and an outer fender is mounted on the flange portion. Accordingly, the outer fender can be contiguously formed with the battery case with the simple structure.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
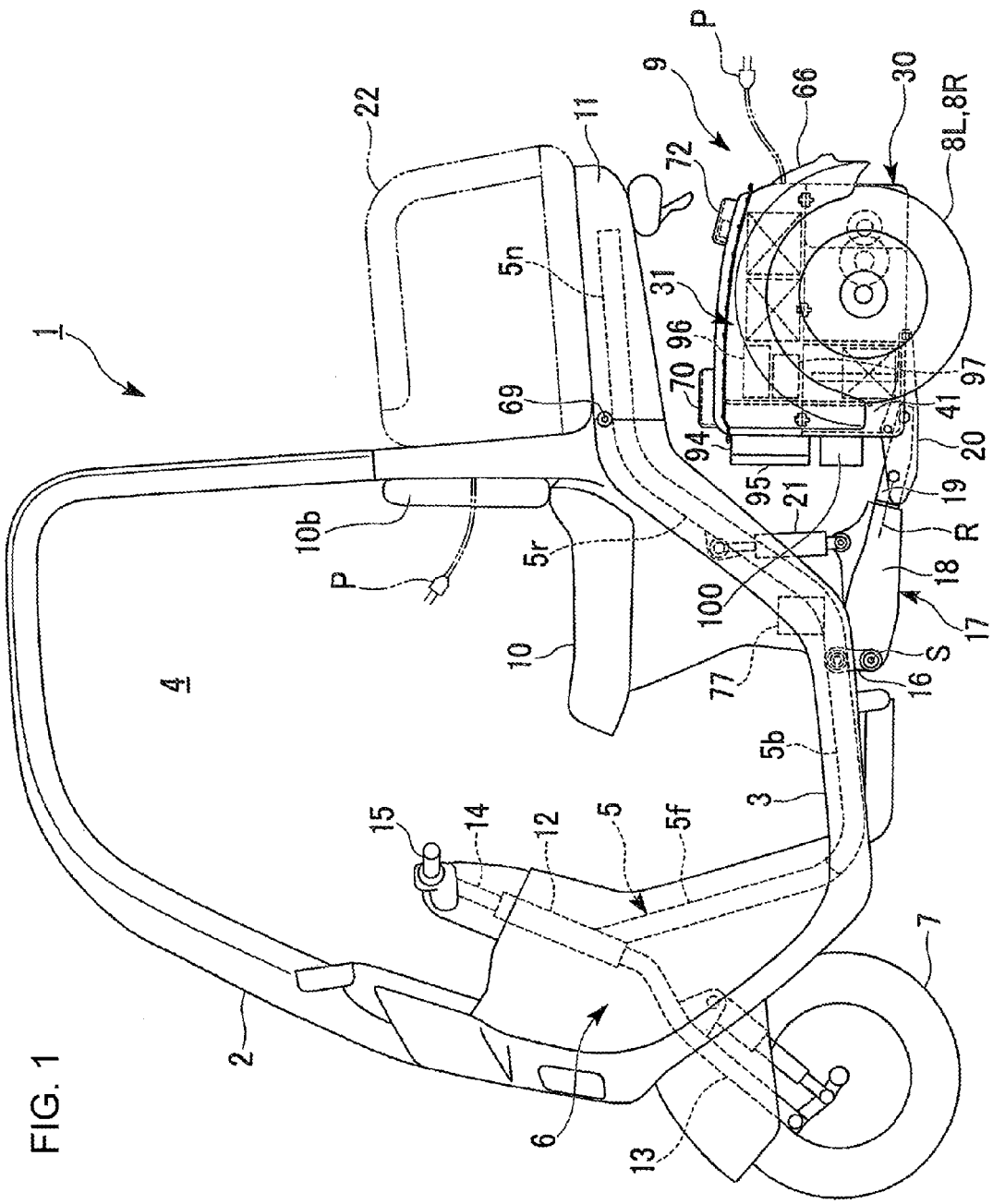
FIG. 1 is a side view of an electrically-operated three-wheeled vehicle according to an embodiment of the present invention.
Figure 2:
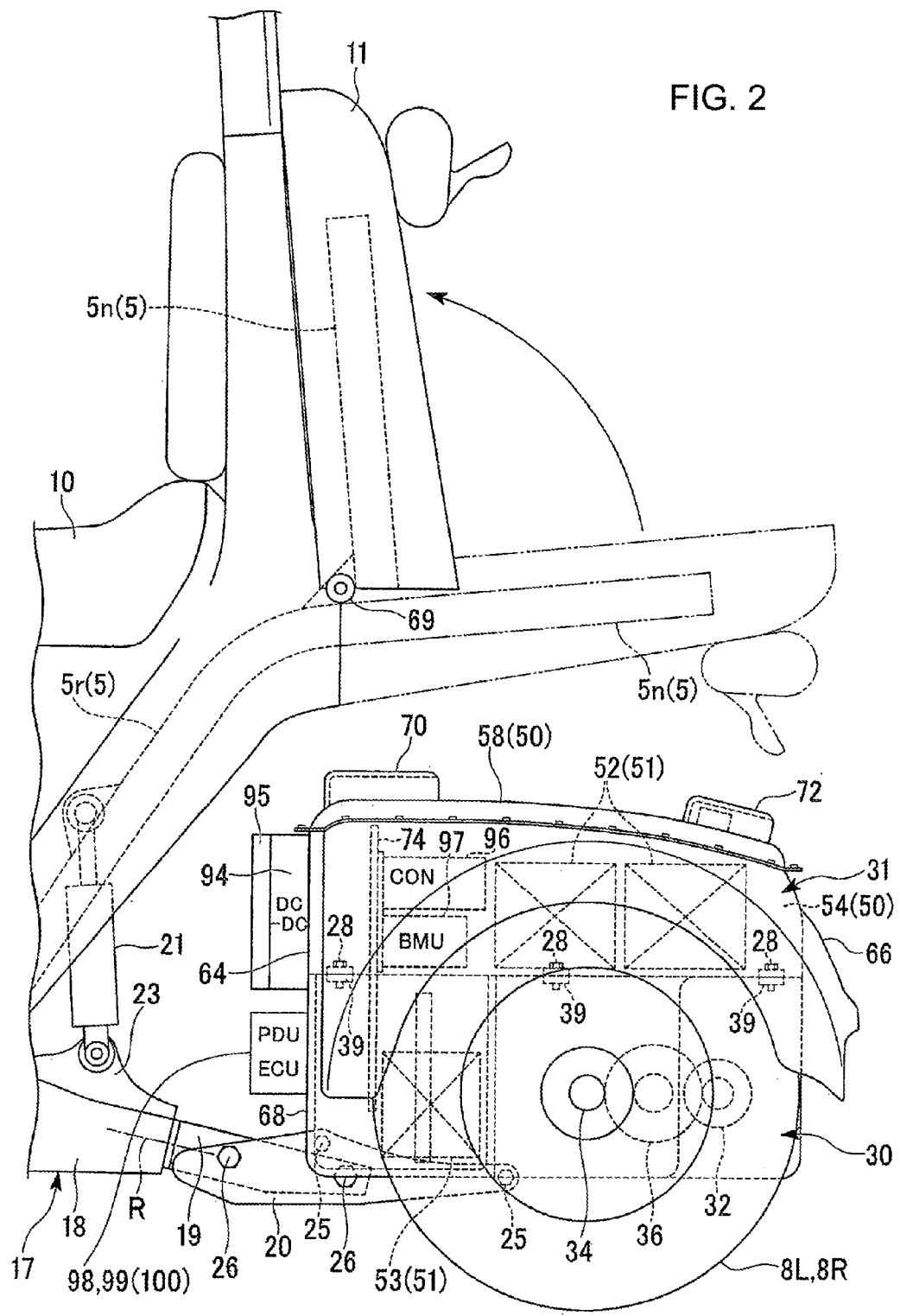
FIG. 2 is an enlarged view of an essential part of the electrically-operated three-wheeled vehicle of FIG. 1, illustrating the area around a carrier.

As shown in FIG. 1 and FIG. 2, an electrically-operated three-wheeled vehicle 1 which constitutes a saddle-ride-type electrically-operated vehicle is a battery-driven-type electrically-operated vehicle. The electrically-operated three-wheeled vehicle 1 has a windscreen 2 on a front face thereof, and includes a roof-equipped cabin 4 having a low-floor-type floor 3 on a bottom surface thereof. The electrically-operated three-wheeled vehicle 1 includes a vehicle body frame 5, which is formed into a U shape as viewed in a side view.

The vehicle body frame 5 is constituted of: a single front frame 5f extending in an oblique downward direction from a front end portion of the vehicle body frame 5; a pair of right and left lower frames 5b formed by splitting to right and left sides at a front lower end thereof and extending rearward along the floor 3 parallel to each other; rear frames 5r extending toward an oblique rear upper side from rear ends of the respective lower frames 5b; and carrier frames 5n extending in the slightly oblique rearward and upward direction from rear ends of the respective rear frames 5r. A front wheel 7 is supported on a front end portion of the front frame 5f by way of a steering mechanism 6, and a power unit 9 that drives left and right rear wheels 8L, 8R is swingably supported at a vehicle widthwise center portion between rear portions of the lower frames 5b. A carrier 11 is mounted on the carrier frames 5n. Accordingly, the carrier 11 is positioned above the power unit 9, and the rear wheels 8R, 8L, which constitute drive wheels, are arranged in the vicinity of the power unit 9. A seat 10 is supported on the lower frames 5b and the rear frames 5r.

As shown in FIG. 2, the carrier 11 is positioned above the power unit 9, that is, above a battery unit 31 (described later) and is upwardly rotatably supported by way of a hinge 69, which is mounted on a proximal portion side of the carrier 11. To be more specific, the carrier frames 5n of the vehicle body frame 5 are divided into a front side and a rear side respectively together with the carrier 11 per se on the proximal portion side of the carrier 11, and the hinge 69 is mounted on or between the divided portions. When the carrier 11 takes a vertical posture, the carrier 11 is fixed by a hook (not shown) to maintain the vertical posture of the carrier 11. By opening a lid 58 of a battery case 50, described hereinafter, maintenance of the inside of the battery case 50 can be carried out. When the carrier 11 takes the horizontal posture, the divided portions of the carrier frames 5n interfere with each other so that the further rotation of the carrier 11 can be restricted and, hence, the carrier 11 can support a downward load applied to the carrier 11 in the horizontal posture. In FIG. 1 a storage box 22 is shown mounted on the carrier 11 (storage box 22 being omitted from FIG. 2 and FIG. 3).

The steering mechanism 6 includes a head pipe 12 that is mounted on a front end of the front frame 5f and extends in the vertical direction. A steering shaft (not shown) in the drawing is rotatably mounted on the head pipe 12. A front fork 13 is mounted on a lower end of the steering shaft, and the front wheel 7 is supported on a lower end of the front fork 13.

A handle post 14 is mounted on an upper end of the steering shaft, and a handle 15 is mounted on an upper end of the handle post 14.

Figure 3:
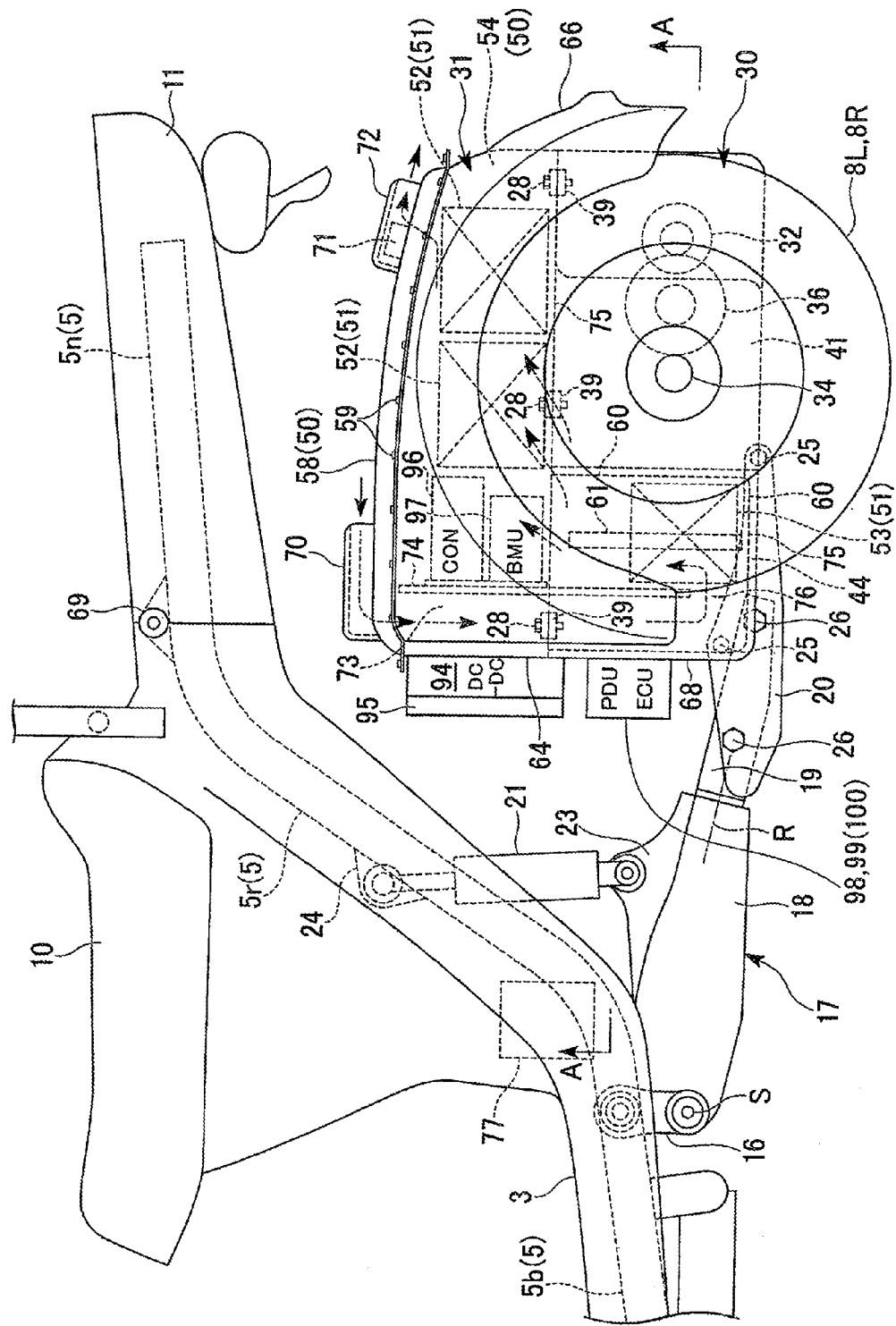
FIG. 3 is an enlarged view similar to that of FIG. 2.
Figure 5:
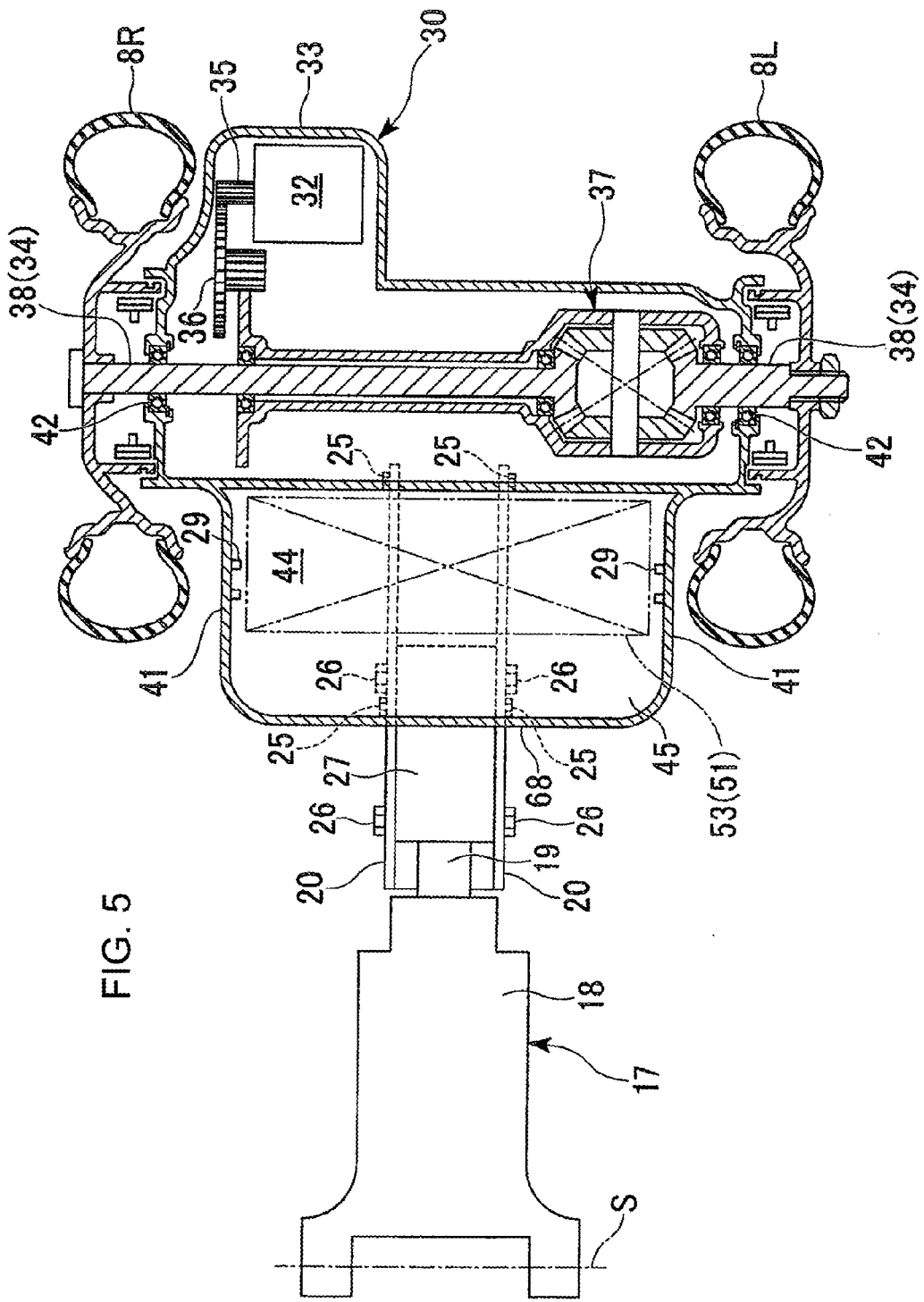
FIG. 5 is a cross-sectional view taken along a line A-A in FIG. 3.

As shown best in FIGS. 3 and 5, between rear end portions of the lower frames 5b, 5b, a link 16 that extends downward is swingably mounted on the lower frames 5b, 5b in a state where the link 16 is swingable within a predetermined range of angles in the longitudinal direction relative to the lower frames 5b, 5b. A swing joint 17 that extends rearward along the vehicle widthwise center portion is mounted on a swing shaft S that is mounted on a lower end portion of the link 16 in a state where the swing joint 17 is vertically swingable relative to the link 16.

The swing joint 17 includes a joint case 18 that has one end thereof supported on the link 16, and a joint shaft 19 that is inserted into the other end side of the joint case 18 and is mounted on the joint case 18 in a rotatable manner relative to the joint case 18 about an axis R, which extends rearward. The joint shaft 19 and a lower wall 45 of the power unit 9 (see FIG. 5) are connected to each other by right and left hanger plates 20, 20. Due to this construction, the joint shaft 19, that is, the power unit 9, is supported on the joint case 18 of the swing joint 17 in a laterally swingable manner about the axis R of the joint shaft 19.

A lower bracket 23 is mounted on an upper portion of the joint case 18 of the swing joint 17. A cross member (not shown) extends between the rear frames 5r, 5r, and an upper bracket 24 is mounted on a vehicle widthwise center portion of the cross member. A rear cushion 21 is mounted between the upper bracket 24 and the lower bracket 23.

The power unit 9 includes a motor unit 30 that is arranged on a lower side, and the battery unit 31 that is arranged above the motor unit 30 and fixed to the motor unit 30 using connecting bolts 28. Upper portions of each of the respective hanger plates 20 are fixed to a front portion of the lower wall 45 of the motor unit 30 at two longitudinally front and rear positions using upper bolts 25, 25, and lower portions of each of the respective hanger plates 20 are mounted on a rear mounting portion 27 of the joint shaft 19 (see FIG. 5) at two longitudinally front and rear positions using lower bolts 26, 26.

Accordingly, the motor unit 30 is vertically swingably supported on the swing joint 17 by way of the link 16. As such, the power unit 9, which is an integral body formed of the motor unit 30 and the battery unit 31, with the battery unit 31 being fixed to the motor unit 30 using the connecting bolts 28, is supported in a vertically swingable manner relative to the vehicle body frame 5 by way of the swing shaft S, and is supported on the vehicle body frame 5 in a laterally swingable manner about the axis R of the joint shaft 19 by way of the joint shaft 19.

Figure 6:
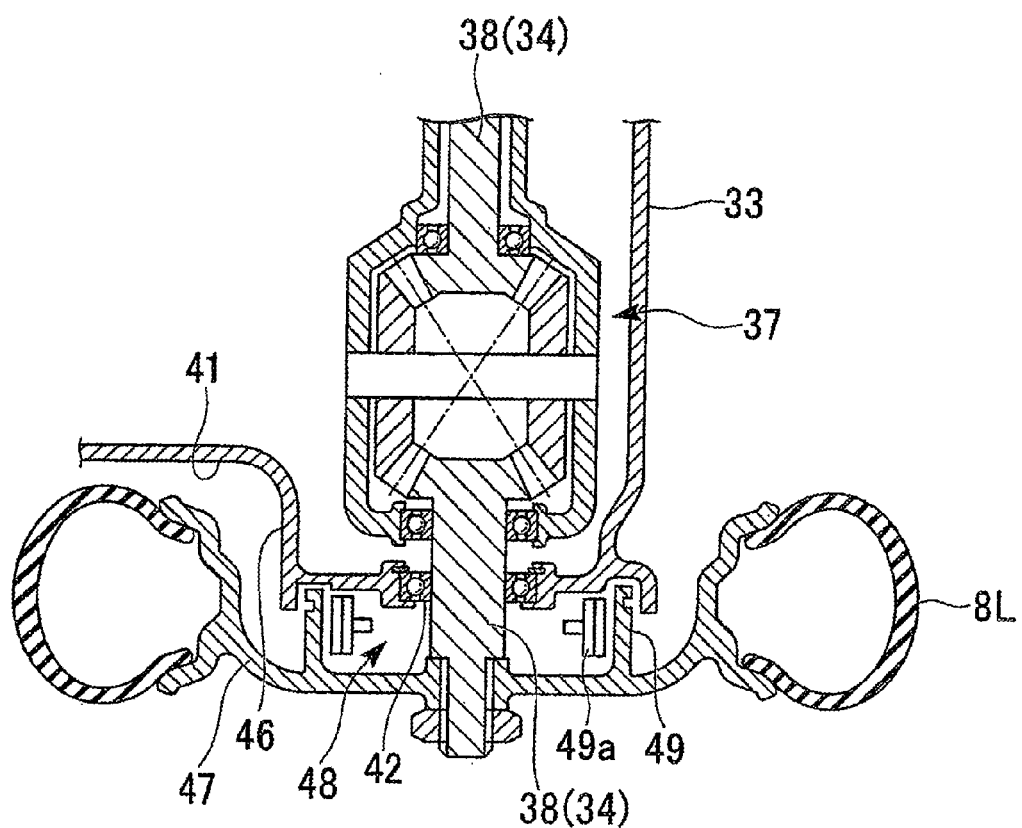
FIG. 6 is an enlarged view of a portion of FIG. 5 showing the area around a differential gear.

As also shown in FIG. 5 and FIG. 6, the motor unit 30 includes, as main parts, a motor 32 for traveling driving which drives the rear wheels 8R, 8L, a differential gear 37 interlockingly connected to the rear wheels 8R, 8L, and an aluminum die-cast motor case 33 housing the motor 32 and the differential gear 37 therein.

The motor 32 is a three-phase AC motor and is arranged behind an axle 34 of the rear wheels 8R, 8L and on a right side of the center in the lateral direction of the vehicle. A carrier of the differential gear 37 is interlockingly connected to a pinion 35 of the motor 32 by way of a counter gear 36. Right and left final shafts 38, 38 are mounted on right and left side gears of the differential gear 37, and the rear wheels 8R, 8L are mounted on the right and left final shafts 38, 38 respectively. The right and left final shafts 38, 38 constitute the axle 34. Here, the differential gear 37 is arranged on a left side of the center in the lateral direction of the vehicle thus reducing the deviation of the weight balance between the differential gear 37 and the motor 32, which is also a heavy part in the vehicle widthwise direction.

The motor case 33 is a member where at least a front upper portion is opened and has case mount seats 39 on an upper peripheral portion thereof (a rear portion may be closed). The motor case 33 is mounted on the battery unit 31 by fastening the connecting bolts 28, which pass through the battery unit 31, to the case mount seats 39. A rear right portion of the motor case 33 projects rearward as a portion where the motor 32 is arranged, and differential bearings 42 are mounted on lower portions of both side walls 41, respectively. On a front portion of the motor case 33, a storing recessed portion 44, which stores a front portion of the battery case 50, that is, a bulging portion 60 (described later) is formed.

On the side walls 41 of the motor case 33, the case mount seats 39 on which a peripheral wall of the battery case 50 is mounted are formed. On the lower wall 45 of a front portion of the storing recessed portion 44, fixing portions (not shown) are formed. In the fixing portions, upper portions of the respective hanger plates 20 are respectively fixed to the lower wall 45 at two longitudinally front and rear positions using the upper bolts 25, 25. On an inner side wall of the storing recessed portion 44, guide rails 29 are formed in the vertical direction.

As shown in FIG. 6, a bulging portion 46, which bulges outward is formed on a rear portion of the left side wall 41 of the motor case 33 around the final shaft 38. A portion of the differential gear 37 is housed in the bulging portion 46. Corresponding to the bulging portion 46, a spoke portion 47 of the left rear wheel 8L is formed in an offset manner in the outward direction from the center of the left rear wheel 8L in the tire widthwise direction and, by making use of a space defined between the spoke portion 47 of the left rear wheel 8L and an inner surface of the bulging portion 46 of the side wall 41, a drum brake unit 48 is arranged in the space. The drum brake unit 48 presses a drum 49 which is mounted on the spoke portion 47 of the rear wheel 8L with a shoe 49a.

As a result, a portion of the differential gear 37 is, together with the drum brake unit 48, placed within a tire width of the left rear wheel 8L. Here, in the same manner as the left side wall 41, the bulging portion 46 is formed on the right side wall 41, the spoke portion 47 of the right rear wheel 8R is formed in an offset manner in the outward direction from the center of the right rear wheel 8R in the tire widthwise direction, and the drum brake unit 48 is arranged in a space defined between the spoke portion 47 of the right rear wheel 8R and an inner surface of the bulging portion 46 of the side wall 41.

Figure 4:
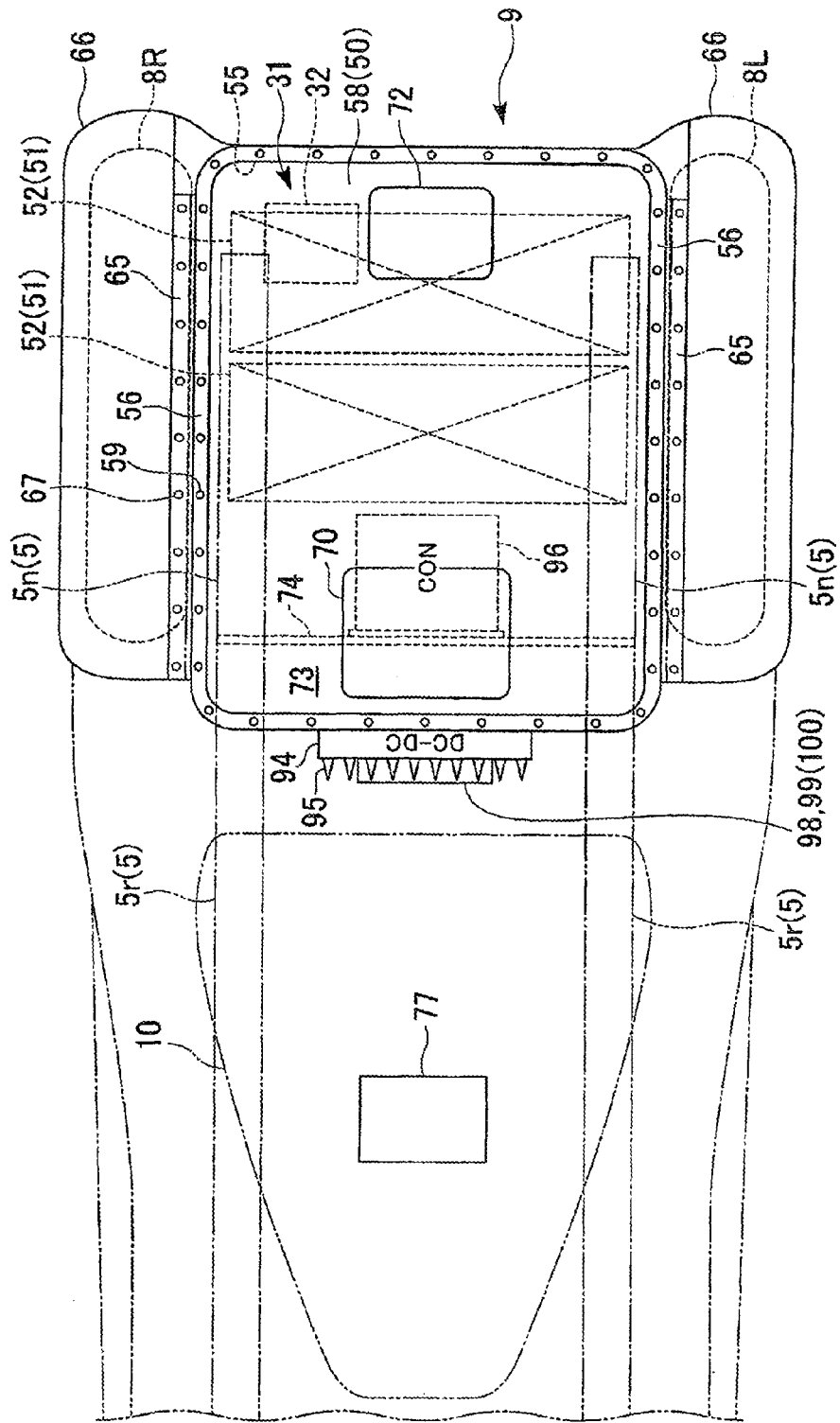
FIG. 4 is a plan view of the essential part shown in FIG. 3.

As shown in FIG. 3 and FIG. 4, the battery unit 31 includes the battery case 50 and a lithium-ion-type battery 51, which is housed in the battery case 50. The battery 51 is constituted of upper batteries 52, which are positioned above the axle 34 of the rear wheels 8R, 8L, and a lower battery 53 (constituting a portion of the battery 51), which is placed between the right and left rear wheels 8R, 8L at a position in front of and below the upper batteries 52 and is arranged in front of the axle 34. Accordingly, the motor 32 and the lower battery 53 are arranged in a distributed manner over the axle 34 of the rear wheels 8R, 8L between a vehicle front side of the axle 34 of the rear wheels 8R, 8L and a vehicle rear side of the axle 34 of the rear wheels 8R, 8L.

The upper batteries 52 are arranged in front of rear ends of the rear wheels 8R, 8L. Here, the battery 51 is constituted by connecting two upper batteries 52 and one lower battery 53 in series. Each one of these upper batteries 52 and the lower battery 53 is constituted by connecting a plurality of battery cells in series. These upper batteries 52, 52 and the lower battery 53 are connected to each other in series and hence, the batteries can generate a high voltage of 48V to 72V, for example. The batteries are charged with electricity supplied from a charging connector 80 described later.

The battery case 50 is constituted of a case body 54, which has an opening part 55 on an upper portion thereof, and the lid 58, which closes the opening part 55. On a bottom wall 75 of a front portion of the case body 54, the bulging portion 60 that bulges downward corresponding to the lower battery 53 is formed so as to house the lower battery 53 therein. On outer surfaces of both side walls of the bulging portion 60, sliders 61 are mounted in the vertical direction, respectively. The sliders 61 are vertically slidably fitted into the guide rails 29 mounted on the inner wall of the storing recessed portion 44 of the motor case 33.

An air intake duct 70, which extends and opens in the rearward direction, is mounted on a vehicle widthwise center portion of a front portion of the lid 58, which is mounted on the battery case 50. Further, on a vehicle widthwise center portion of a rear portion of the lid 58, a cooling fan 71, which sucks and discharges inside air for cooling the upper batteries 52 and the lower battery 53, and a discharge duct 72, which opens toward a rear side, are integrally formed.

Inside the case body 54, an air introducing passage 73 is formed. The air introducing passage 73 fluidly communicates with the air intake duct 70 of the lid 58 and extends downward while being bent with respect to the air intake duct 70 in a state where the lid 58 is mounted on the case body 54. The air introducing passage 73 is formed between a partition wall 74 that is formed in the inside of the case body 54 and a front wall 64 of the battery case 50. The partition wall 74 extends to an area in the vicinity of the bottom wall 75 of the bulging portion 60 of the case body 54. An introducing port 76 is formed between a lower end of the partition wall 74 and the bottom wall 75.

Figure 7:
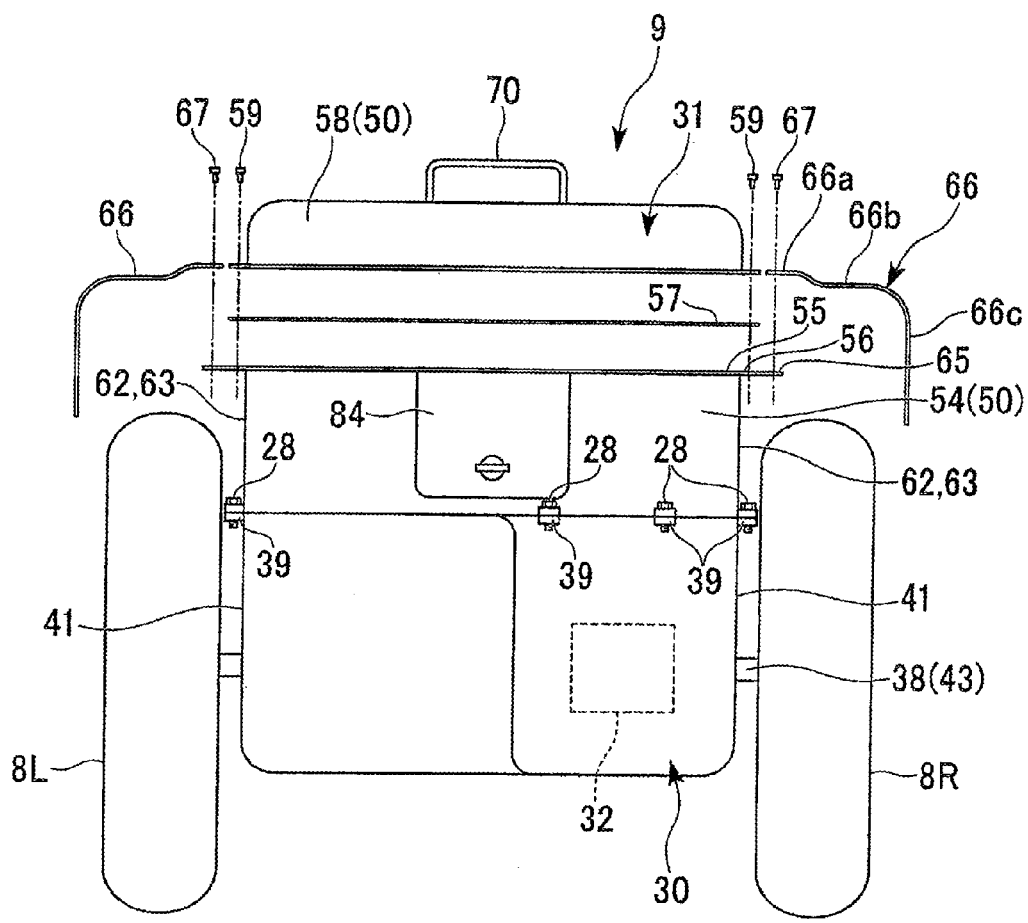
FIG. 7 is a rear view showing a rear fender in cross section.

As shown in FIG. 7, right and left side walls 62, 62 of the case body 54 other than the bulging portion 60 are arranged inside the rear wheels 8R, 8L and close to the rear wheels 8R, 8L, and portions of the side walls 62 constitute or serve as inner fenders 63 of the rear wheels 8R, 8L.

A flange portion 56 is formed on a periphery of the opening part 55 of the case body 54. The lid 58 is fixed to the flange portion 56 using bolts 59 by way of a sealing material 57. Due to this construction, the opening part 55 is opened by removing the lid 58 with the removal of the bolts 59, while the opening part 55 can be closed by the lid 58 by fastening the bolts 59.

The flange portion 56 includes flange extending portions 65 whose side edge portions project outward in the left and right directions from the arrangement position of the sealing material 57. Outer fenders 66 are mounted on the flange extending portions 65 using fender bolts 67. Each outer fender 66 is constituted of an upper edge flange portion 66a that is fastened to the flange extending portion 65 of the case body 54 of the battery case 50, a connecting portion 66b that is contiguously connected to the upper edge flange portion 66a and is bent downward, and a fender body 66c that projects outward in the horizontal direction from the connecting portion 66b and is formed into an arcuate shape in the longitudinal direction.

A traveling wind during vehicle traveling and an air flow generated by the rotation of the rear wheels 8R, 8L flow along the side walls 62 of the case body 54, which function as the inner fenders 63 and the outer fenders 66, thus cooling the battery case 50.

Figure 8:
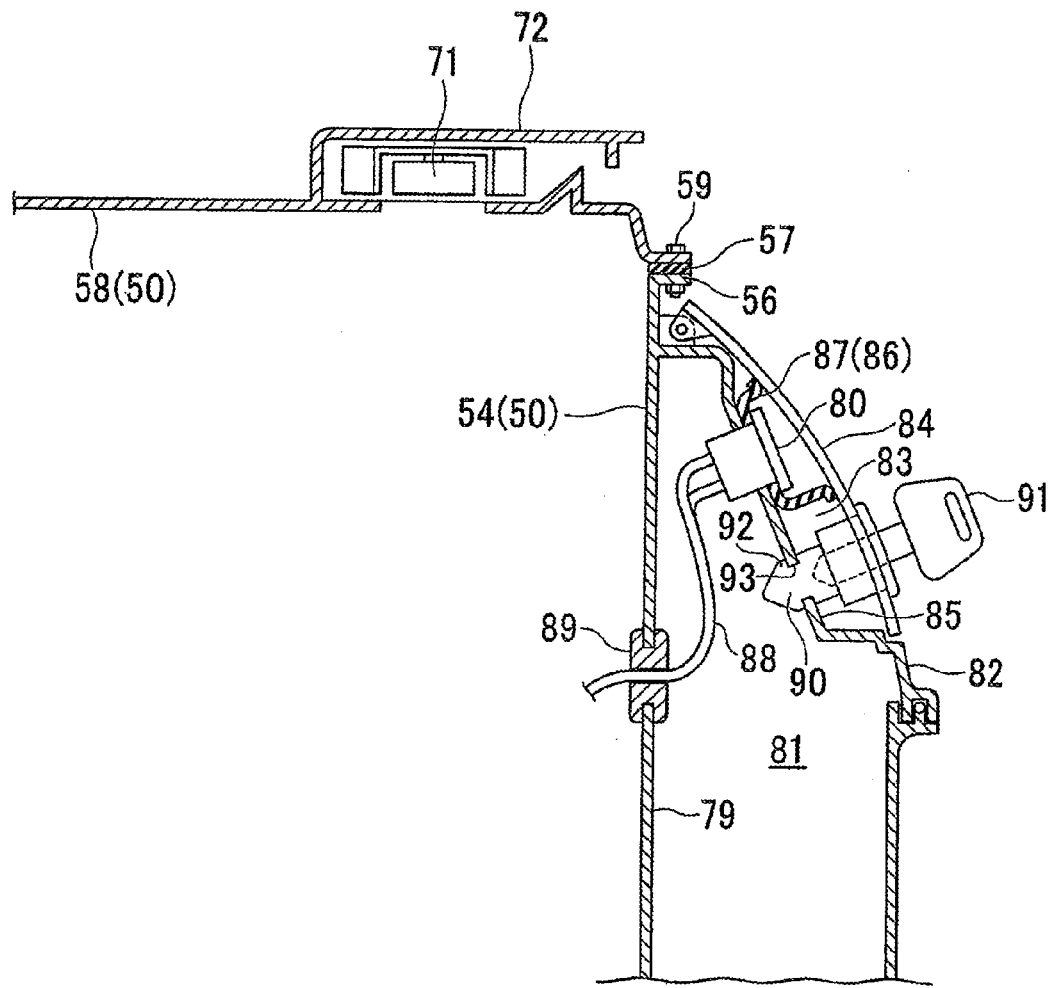
FIG. 8 is a cross-sectional view of a battery case in the vicinity of a charging connector.
Figure 9:
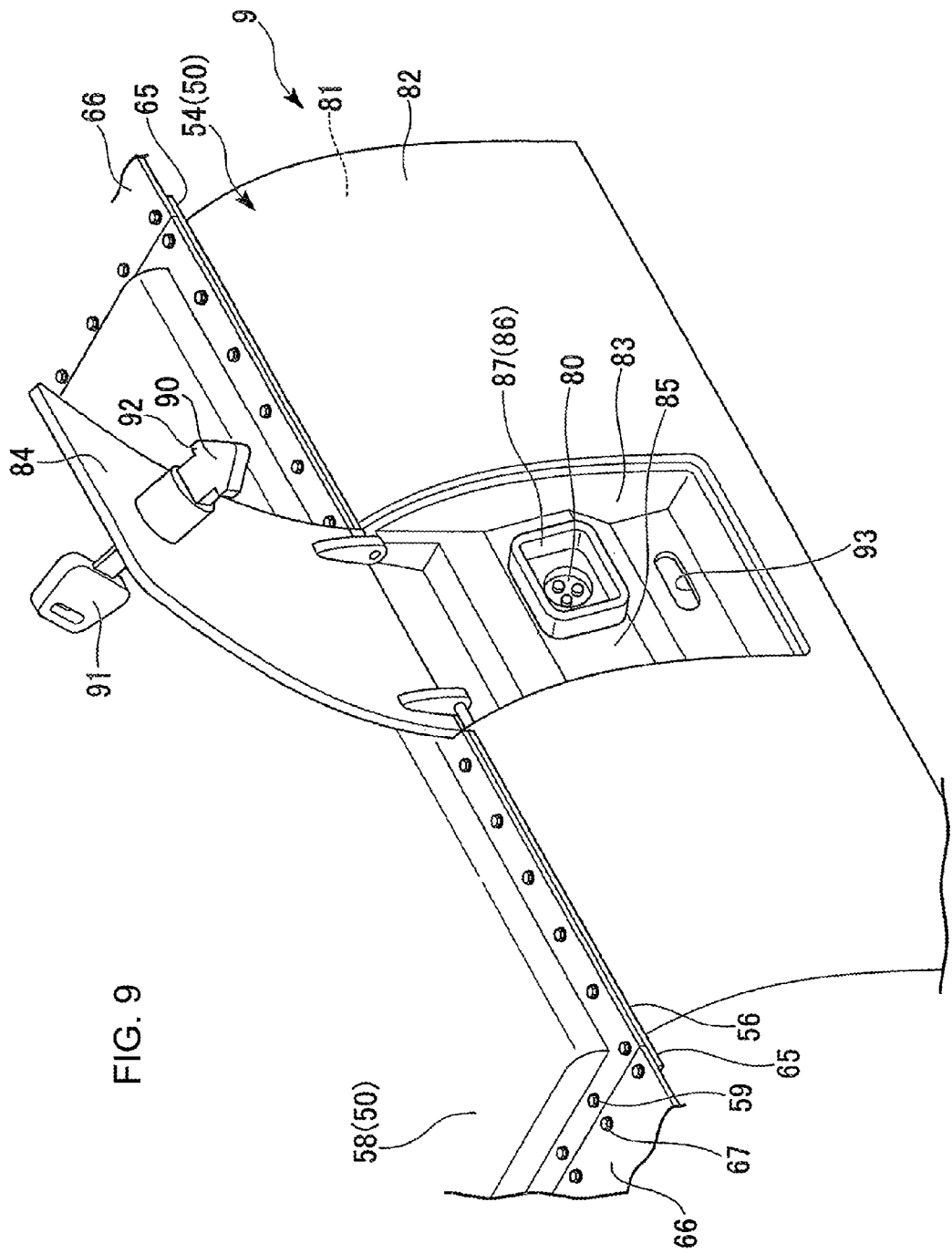
FIG. 9 is a perspective view of the battery case in the vicinity of the charging connector.

As shown in FIG. 8 and FIG. 9, on a rear wall 79 of the case body 54 of the battery case 50, a wall portion 82 that forms a connector housing portion 81 for housing the charging connector 80 behind the rear wall 79 is mounted. A recessed portion 83 is formed on the wall portion 82. A lid 84 that has an upper end thereof supported on the case body 54 is mounted on the recessed portion 83 in an openable and closable manner, and when the lid 84 is closed, the lid 84 forms a surface coplanar with the wall portion 82.

The charging connector 80 into which a charging plug of an external facility is inserted is arranged on a bottom wall 85 of the recessed portion 83. The charging connector 80 is fixed to the bottom wall 85 by way of a waterproof and dustproof seal rubber 86. The periphery of the charging connector 80 is covered with a peripheral wall 87 of the seal rubber 86. A harness 88 extending from the charging connector 80 penetrates a grommet 89, which is mounted on the rear wall 79 of the case body 54, and extends to the inside of the case body 54.

A lock key 90 is mounted on the lid 84. In the bottom wall 85 of the recessed portion 83, a lock hole 93 is formed. An engaging portion 92 of the lock key 90 is engaged with the lock hole 93 when the lid 84 is closed and the lock key 90 is rotated by a key 91.

As shown in FIG. 3 and FIG. 4, an auxiliary battery 77 that supplies a voltage to 12V accessories and a control device is mounted on a vehicle widthwise center portion of the vehicle body frame 5, which is a portion where the lower frames 5b and the rear frames 5r are connected to each other using bolts. On an upper outer surface of a vehicle widthwise center portion of the front wall 64 of the battery case 50, a DC-DC converter (DC-DC) 94, which lowers a voltage of the battery 51 and supplies the lowered voltage to the auxiliary battery 77, is mounted using bolts. The DC-DC converter includes vertical fins 95 for heat radiation on a front surface thereof.

Inside the battery case 50, a contactor (CON) 96 that turns on/off a drive circuit of the motor 32 and a battery managing unit (BMU) 97, which is arranged below the contactor 96 and controls charging and discharging of the battery 51, are mounted on an upper portion of the vehicle widthwise center portion of the partition wall 74 of the case body 54 using bolts. On a vehicle widthwise center portion of the front wall 68 of the motor case 33, which is positioned in front of the battery case 50, a control unit 100 is mounted using bolts.

The control unit 100 is formed by integrally connecting a power drive unit (PDU) 98, which is a switching unit (driver) for driving the motor 32, and an ECU 99, which controls the battery managing unit 97 and the power drive unit 98, to each other. An accelerator opening signal of an accelerator grip, which is mounted on the handle 15, is inputted to the ECU 99, and the battery managing unit 97 and the power drive unit 98 are controlled based on the accelerator opening signal. Here, the ECU 99 receives not only the accelerator opening signal but also signals from a group of various kinds of sensors, and outputs control signals for various accessories.

Figure 10:
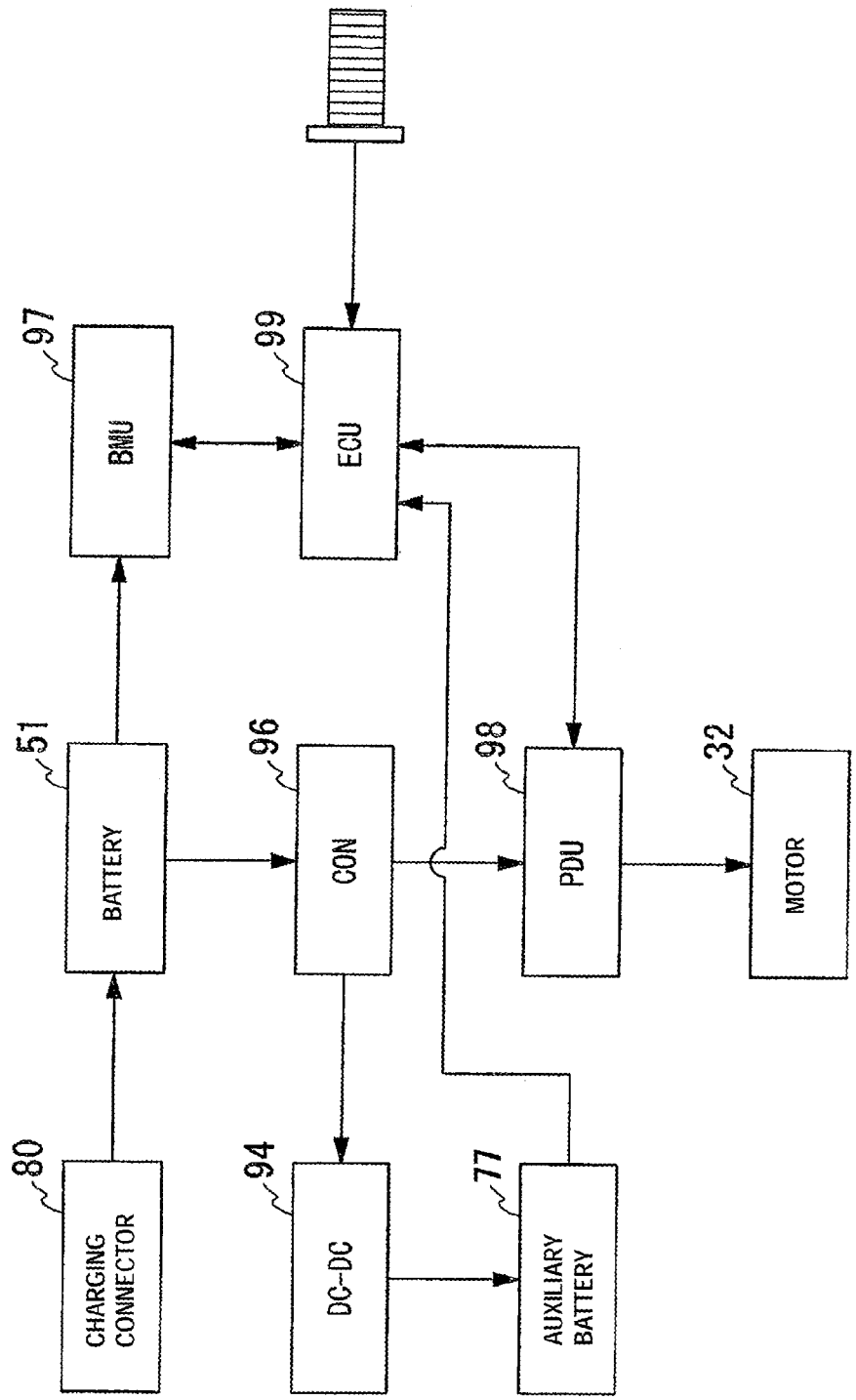
FIG. 10 is a block diagram schematically showing the arrangement of electric equipment according to the present invention; and, FIG. 11 is an enlarged view of an essential part of a second embodiment of the present invention.

Accordingly, as shown in FIG. 10, electricity from the battery 51 is supplied to the power drive unit 98 through the contactor 96, which is interlocked with a main switch (not shown), and the electricity is converted into a three-phase AC from a DC by the power drive unit 98 and, thereafter, the three-phase AC is supplied to the motor 32, which is a three-phase AC motor. Further, an output voltage from the battery 51 is lowered through the DC-DC converter 94, and the lowered voltage is supplied to the auxiliary battery 77.

A charge/discharge state, a temperature and the like of the battery 51 are monitored by the battery managing unit 97, and such information is shared with the ECU 99. Signal information from a group of various kinds of sensors are inputted to the ECU 99 in addition to the accelerator opening signal, and the ECU 99 performs a drive control of the motor 32 through the power drive unit 98 based on such information. Electricity is supplied to the battery 51 from an external power supply unit through the charging connector 80.

According to the above-mentioned embodiment, the power unit 9, which is constituted by connecting the battery unit 31 and the motor unit 30 to each other, is supported on the lower end of the rear cushion 21 and, hence, the lower battery 53 can be further arranged at the lower end of the rear cushion 21 in addition to the upper batteries 52.

Due to such a constitution, compared to a case where only the upper batteries 52 are arranged at the lower end of the rear cushion 21, it is possible to lower the center of gravity of the vehicle by an amount corresponding to the arrangement of the lower battery 53 and, at the same time, a battery capacity can be increased, thus extending a traveling distance of the electrically-operated three-wheeled vehicle 1.

Further, the lower battery 53 and the motor 32, which are positioned on a lower side of the vehicle body and are heavy parts, are arranged in a distributed manner over the axle 34 of the rear wheels 8R, 8L between the vehicle front side of the axle 34 of the rear wheels 8R, 8L and the vehicle rear side of the axle 34 of the rear wheels 8R, 8L and, hence, a large amount of weight can be distributed in a well-balanced manner longitudinally over the axle 34.

Since the upper batteries 52 are arranged in front of the rear ends of the rear wheels 8R, 8L, an impact generated when a rear surface of the vehicle is involved in a collision is received by the rear wheels 8R, 8L and, hence, it is possible to protect the battery 51, particularly the upper batteries 52, from the impact.

The carrier 11 is provided above the battery unit 31, and the carrier 11 is supported in an upwardly rotatable manner by way of the hinge 69 integrally with the carrier frames 5n of the vehicle body frame 5. Due to such a constitution, by opening the carrier 11, an area above the battery unit 31, that is, an area above the upper batteries 52 and the lower battery 53, can be accessed. Accordingly, by removing the lid 58 from the case body 54 with the removal of the bolts 59 from the lid 58, the maintenance of the battery 51 and other stored parts is facilitated.

The battery 51 is housed in the battery case 50, and the right and left side walls 62 of the battery case 50 constitute the inner fenders 63 and hence, the number of parts can be reduced by effectively making use of the battery case 50.

The flange extending portions 65 that project outward in the left and right directions are formed on the flange portion 56 of the battery case 50, and the outer fenders 66 are mounted on the flange extending portions 65. Accordingly, the outer fenders 66 can be contiguously formed with the battery case 50 with the simple structure.

Further, a traveling wind during vehicle traveling and an air flow generated by the rotation of the rear wheels 8R, 8L flow along the side walls 62 of the battery case 50, which function as the inner fenders 63, and the outer fenders 66 and, hence, the present invention can help cool the battery case 50.

Figure 11:
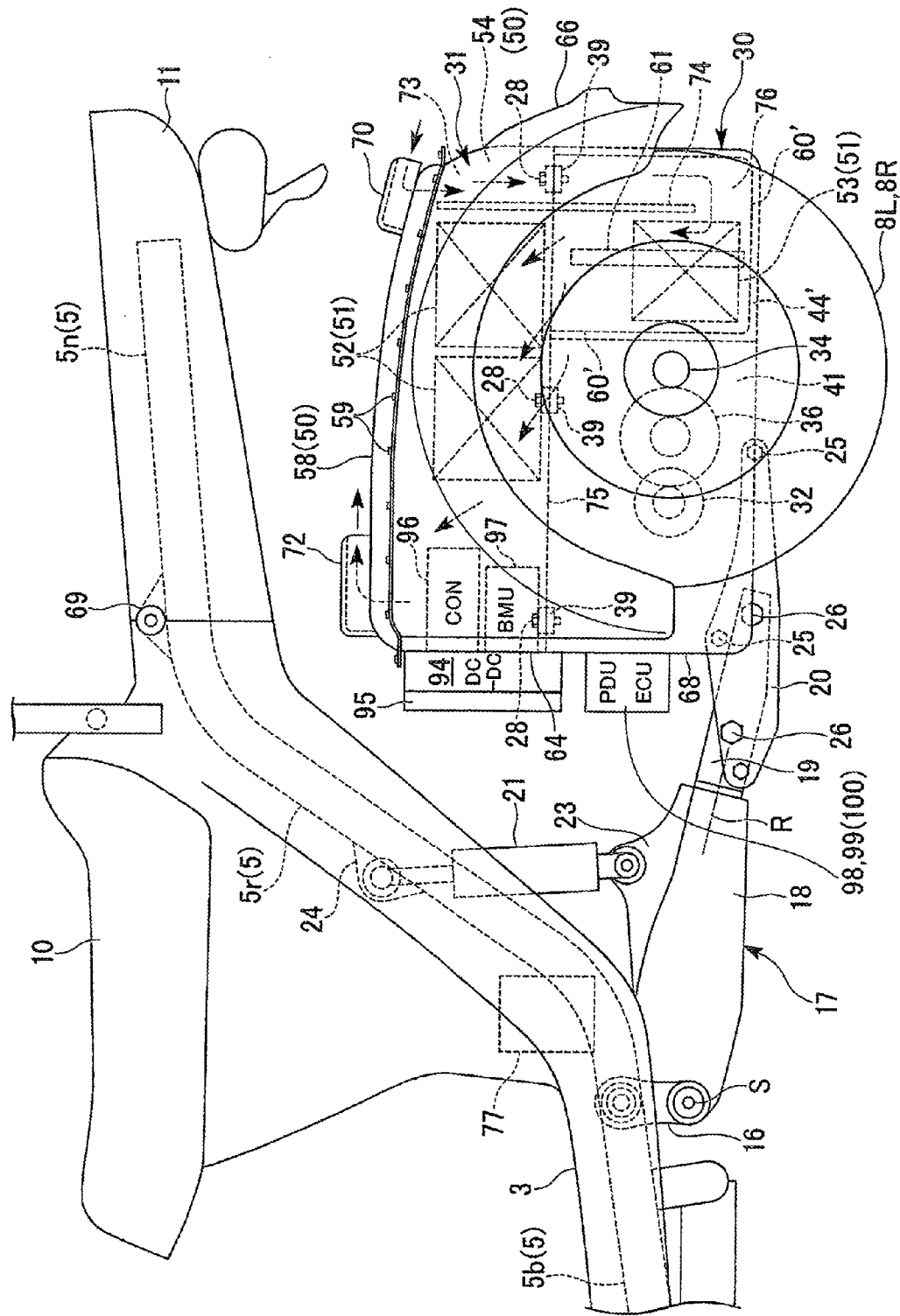

Next, a second embodiment of the present invention is explained with reference to FIG. 11.

The second embodiment differs from the first embodiment in the construction of a battery case 50 and a motor case 33, which together constitute a power unit 9. In this embodiment, a bulging portion 60' is formed on a bottom wall 75 on a rear side of a case body 54 of the battery case 50, and a storing recessed portion 44' is formed on a rear portion of the motor case 33 corresponding to the bulging portion 60'. Further, a motor 32 is arranged at a front portion of the motor case 33. The motor 32 and a lower battery 53, which is housed in the bulging portion 60' of the case body 54 of the battery case 50, are arranged in a distributed manner over an axle 34 of rear wheels 8R, 8L between a vehicle front side of the axle 34 of the rear wheels 8R, 8L and a vehicle rear side of the axle 34 of the rear wheels 8R, 8L.

Further, by arranging the bulging portion 60' on the rear side, positions of a discharge duct 72, an air intake duct 70, an air introducing passage 73 and a partition wall 74 become longitudinally opposite to the positions of these parts in the first embodiment. Further, a battery 51 is positioned in front of rear ends of the rear wheels 8R, 8L. Here, other structures, components, and manner of operations are substantially equal to those of the first embodiment and hence, parts identical with the parts in the first embodiment are given same symbols and their explanation is omitted.

Also in this embodiment, in addition to the advantageous effects of the above-mentioned first embodiment, the motor 32 and the lower battery 53, which are positioned on a lower side of a vehicle body and are heavy parts, are arranged in a distributed manner over the axle 34 of the rear wheels 8R, 8L between the vehicle front side of the axle 34 of the rear wheels 8R, 8L and the vehicle rear side of the axle 34 of the rear wheels 8R, 8L and hence, a large amount of weight can be distributed in a well-balanced manner longitudinally over the axle 34.

Here, the present invention is not limited to the above-mentioned embodiments. For example, the present invention is also applicable to an electrically-operated four-wheeled vehicle. Further, the battery is not limited to the lithium-ion battery, and a secondary battery which is rechargeable such as a nickel metal hydride battery or a lead battery may be used.

Further, the explanation has been made with respect to a case where the battery is charged using an external commercially available charging device by providing the charging connector 80. However, the present invention may adopt a method where the battery is charged with a household power source. In this case, as indicated by a chained line in FIG. 1, a plug P for 100V may be housed in the connector housing portion 81 together with a cord. Further, a seat back 10b of the seat 10 may be frontwardly inclined and the plug P for 100V and the cord may be stored on a back surface side of the seat back 10b. When the plug P for 100V is used, an inverter is provided in the inside of the battery case 50.

DESCRIPTION OF REFERENCE NUMBERS AND SIGNS 8R, 8L: rear wheel
32: motor
51: battery
53: lower battery
34: axle
5r: rear frame (vehicle body frame)
21: rear cushion
11: carrier
69: hinge
50: battery case
62: side wall
63: inner fender
57: seal material (seal)
58: lid
65: flange extending portion (flange portion)
66: outer fender

What is claimed is:

1. A saddle-ride-type electrically-operated vehicle which includes rear wheels on right and left sides of a rear portion of a vehicle body, comprising:
    a motor for traveling driving which drives the rear wheels;
    an upper battery that is disposed between the rear wheels and relatively above the motor, said upper battery also being located between front and rear ends of the rear wheels; and
    a lower battery that is placed between the right and left rear wheels, said lower battery being disposed entirely vertically below the upper battery and forward of a rear axle interconnecting said right and left rear wheels,
    wherein the lower battery and the motor are arranged in a distributed manner over the axle of the rear wheels between a vehicle front side of the axle of the rear wheels and a vehicle rear side of the axle of the rear wheels, an upper end portion of a rear cushion is supported on a vehicle body frame, and the upper battery and the motor are supported on a lower end of the rear cushion.

2. The saddle-ride-type electrically-operated vehicle according to claim 1, wherein a carrier is provided above the upper battery, and the carrier is upwardly rotatably supported via a hinge.

3. The saddle-ride-type electrically-operated vehicle according to claim 2, wherein the upper battery is housed in a battery case, and right and left side walls of the battery case serve as inner fenders.

4. The saddle-ride-type electrically-operated vehicle according to claim 3, wherein the battery case includes an openable/closable lid provided with a seal on an upper portion thereof, a flange portion that bulges outward in the lateral direction from the seal portion is formed on the side walls of the battery case, and an outer fender is mounted on the flange portion.

5. The saddle-ride-type electrically-operated vehicle according to claim 1, wherein the upper battery is housed in a battery case, and right and left side walls of the battery case serve as inner fenders.

6. The saddle-ride-type electrically-operated vehicle according to claim 5, wherein the battery case includes an openable/closable lid provided with a seal on an upper portion thereof, a flange portion that bulges outward in the lateral direction from the seal portion is formed on the side walls of the battery case, and an outer fender is mounted on the flange portion.

7. A saddle-ride-type electrically-operated vehicle which includes rear wheels on right and left sides of a rear portion of a vehicle body, comprising:
    a motor for traveling driving which drives the rear wheels;
    a battery including an upper battery and a lower battery, said upper battery being disposed between the rear wheels and relatively above the motor, said upper battery being located between front and rear ends of the rear wheels and above a rear axle interconnecting said right and left rear wheels and said lower battery being disposed between the right and left rear wheels and entirely vertically below said upper battery and forward of the rear axle,
    wherein the lower battery and the motor are arranged in a distributed manner over the rear axle between a vehicle front side of the rear axle and a vehicle rear side of the rear axle such that one of said lower battery and motor is arranged on one side of the rear wheel axle and the other of said lower battery and motor is arranged on the other side of said rear wheel axle, an upper end portion of a rear cushion is supported on a vehicle body frame, and the upper battery, lower battery, and motor are supported on a lower end of the rear cushion, and wherein the rear cushion is disposed forwardly of the motor, the upper battery, and the lower battery.

8. The saddle-ride-type electrically-operated vehicle according to claim 7, wherein a carrier is provided above the upper battery, and the carrier is upwardly rotatably supported via a hinge.

9. The saddle-ride-type electrically-operated vehicle according to claim 7, wherein the upper battery is housed in a battery case, and a right side wall of the battery case serves as an inner fender for the right rear wheel and a left side wall of the battery case serves as an inner fender for the left rear wheel.

10. The saddle-ride-type electrically-operated vehicle according to claim 9, wherein the battery case includes an openable/closable lid provided with a seal on an upper portion thereof, a flange portion that bulges outward in the lateral direction from the seal portion is formed on the side walls of the battery case, and an outer fender is mounted on the flange portion.

11. The saddle-ride-type electrically-operated vehicle according to claim 1, wherein the cushion is disposed forwardly of the motor, the upper battery, and the lower battery.

* * * * *